UNITED STATES PATENT OFFICE.

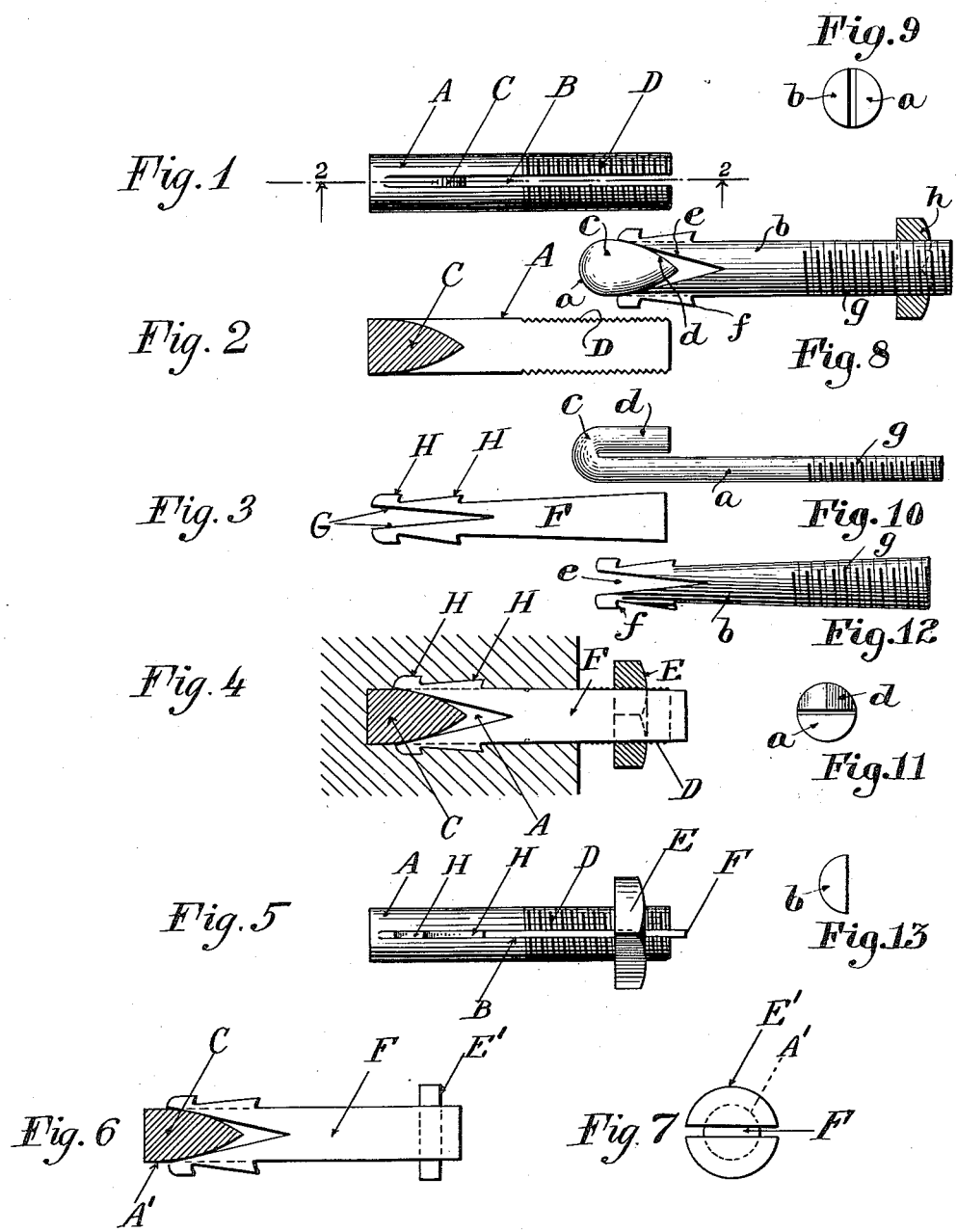
J. H. SKELTON.
FASTENING DEVICE.
APPLICATION FILED JULY 8, 1910.
990,460. Patented Apr. 25, 1911.

JOHN H. SKELTON, OF BAYONNE, NEW JERSEY, ASSIGNOR TO THE PATENT APPLIANCE COMPANY, A CORPORATION OF NEW YORK.

FASTENING DEVICE.

990,460.   Specification of Letters Patent.   Patented Apr. 25, 1911.

Application filed July 8, 1910.   Serial No. 571,011.

*To all whom it may concern:*

Be it known that I, JOHN H. SKELTON, a citizen of the United States, and a resident of Bayonne, New Jersey, have invented certain new and useful Improvements in Fastening Devices, of which the following is a specification accompanied by drawings.

This invention relates to a new and improved form of fastening device of that class in which there are coöperating expansible and expanding members, one of which is an outer member and the other an inner member or bolt, which latter member has heretofore been the fastening member by which any suitable article is secured in position. In accordance with this invention, however, the inner member is preferably the expansible member and the outer expanding member which may be in the form of a bolt is the fastening member for securing articles in position.

Another object of the invention is to enable fastening devices of very small as well as large sizes to be secured in a building construction by means of an inner expansible member which locks the device in place and increases the holding power or resistance to withdrawal of the device with increase of outward pull on the outer expanding member up to a high maximum measured to a large extent by the strength of the device and the resistance to abrasion of the material in which the device is set.

The invention in its preferred embodiments is described and claimed in this specification and shown in the accompanying drawings, in which—

Figure 1 is a side view of a fastening device embodying the invention; Fig. 2 is a longitudinal sectional view on the line 2—2 of Fig. 1; Fig. 3 is a side view of an inner expansible member; Fig. 4 is a side view partly in longitudinal section of a fastening device inserted in a wall construction; Fig. 5 is a side view of a fastening device assembled; Fig. 6 is a side view partly in longitudinal section of a modified form of device; Fig. 7 is a front end view of Fig. 6; Fig. 8 is a side view of a modified form of device; Fig. 9 is a plan view; Fig. 10 is a side view of the expanding member; Fig. 11 is a plan view; Fig. 12 is a side view of the expansible member; and Fig. 13 is a plan view.

Referring to the form of device shown in Figs. 1 to 5 of the drawings, A represents the outer expanding member or bolt slotted longitudinally at B for a portion of its length and provided with an expanding portion C at the base of the slot in the form of a wedge. In this form of the device the bolt is screw threaded at D and provided with a head or nut E coöperating with the screw threads. An inner expansible member F is adapted to enter the slot B in the bolt, and this member is of such size and proportions that normally the sides of the expansible member do not project beyond the periphery of the bolt until expansion takes place. The expansible member F as shown is forked at G and the outer edges of the fork are provided with gripping teeth H which project rearwardly. The angle of the wedge C as shown is slightly greater than the angle of the fork G, so that by forcing the wedge and fork G together the legs of the fork are forced apart or expanded, thus forcing the teeth H beyond the periphery of the bolt.

In the operation of the device the outer expanding member or bolt A is first inserted in a suitable hole in the material of the building construction as in a wall shown in Fig. 4, and then the expansible member F is inserted in the slot B and the fork G is driven over the wedge C as by means of a hammer, thus forcing the teeth H outward into the material of the wall and embedding said teeth in the wall whether said building construction is of wood, stone, cementitious material or other construction. The article to be supported by the bolt is then secured in place against the wall on the outer expanding member or bolt A by means of the nut E. It will be seen that an outward pull upon the bolt tends to force the wedge C farther into the fork G and thus presses the teeth H more securely into the building construction, so that the greater the weight or the harder the pull the more firmly the teeth grip the material in which they are embedded, until the bolt shall break or until the material of the wall shall collapse or give under the strain.

In Figs. 6 and 7 a modification of the device is shown in which the bolt A′ is provided with a head E′ integral with the body of the bolt and slotted to permit the entrance of the expansible member F. Otherwise the construction of the bolt and expansible member is like that shown in the other figures.

In Figs. 8 to 13 a modification of the device is shown illustrating a construction in which the slot is done away with. Both the expanding member *a* and the expansible member *b* are formed out of half round material, and laid side by side with the flat faces meeting. The member *a* is bent upon itself at one end at *c* and beveled to form a wedge *d*. The expansible member *b* is forked at *e* and provided with teeth *f*. The outer ends of the members are screw threaded at *g* to receive a nut *h*, so that in this case the articles to be held are secured upon both members. It will be seen that this modification may be put in place and expanded by first inserting the member *a* then driving in the member *b* thereby expanding it and lastly attaching the article to be held by means of the nut *h*.

Various modifications of the device may be constructed without departing from the spirit of the invention and all embodying the same principles of construction.

I claim and desire to obtain by Letters Patent the following:

1. A fastening device comprising an expanding bolt or member having an expanding wedge, and a forked and toothed expansible coöperating member adapted to be expanded by a relative outward movement of said wedge and provided with a plurality of rearwardly directed teeth.

2. A fastening device comprising a longitudinally slotted bolt having a wedge shaped portion at the base of the slot, and a forked and toothed member adapted to enter the slot and be expanded over said wedge.

3. A fastening device comprising a longitudinally slotted bolt having an expanding member at the base of the slot, and an expansible toothed member adapted to enter the slot and be expanded by coöperation with said expanding member said expansible member projecting rearward from the said slot whereby it may be hammered or driven into the same.

4. A fastening device comprising a longitudinally slotted bolt having a wedge shaped expanding portion at the base of the slot, and a forked expansible member having gripping teeth on the outer portions of the fork, said expansible member being adapted to enter the slot and be expanded over the wedge, thereby forcing the teeth outwardly beyond the periphery of the bolt.

5. A fastening device comprising a longitudinally slotted outwardly screw-threaded bolt having a wedge at the base of the slot, a screw-threaded nut or head for said bolt, and an outwardly toothed forked flat member adapted to enter said slot, with the fork over the wedge, whereby when the said flat member and wedge are forced together the fork is expanded and the teeth project beyond the periphery of the bolt.

6. A fastening device combining an expansible member forked at its inner end and provided with rearwardly directed teeth on the forked portion thereof and a coöperating member having one or more flat surfaces lying longitudinally against a corresponding surface of the first said member and provided with a wedge at its inner end directed rearward for coöperation with the said forked portion the said forked portion being expansible by yielding in the directions parallel with the flat faces, whereby the fastening device is expanded by the relative inward movement of the first said member and the relative outward movement of the other member.

In testimony whereof I have signed this specification in the presence of two subscribing witnesses.

JOHN H. SKELTON.

Witnesses:
 HORACE ROBERSON,
 ARTHUR W. SEYMOUR.